United States Patent [19]

Tanahashi et al.

[11] Patent Number: 6,043,308
[45] Date of Patent: Mar. 28, 2000

[54] CONDUCTIVE RUBBER COMPOSITION AND PROCESS FOR THE PRODUCTION THEREOF

[75] Inventors: Naoki Tanahashi; Kouichirou Maeda, both of Yokohama, Japan

[73] Assignee: Nippon Zeon Co., Ltd., Tokyo, Japan

[21] Appl. No.: 08/983,251

[22] PCT Filed: Jul. 11, 1996

[86] PCT No.: PCT/JP96/01934

§ 371 Date: May 11, 1998

§ 102(e) Date: May 11, 1998

[87] PCT Pub. No.: WO97/03122

PCT Pub. Date: Jan. 30, 1997

[30] Foreign Application Priority Data

Jul. 11, 1995 [JP] Japan ..................................... 7-198070

[51] Int. Cl.$^7$ ...................................................... C08K 3/00
[52] U.S. Cl. ........................................... 524/495; 524/495
[58] Field of Search ..................................... 524/495, 496

[56] References Cited

U.S. PATENT DOCUMENTS 5,140,371  8/1992  Ishihara et al. ........................... 355/219

FOREIGN PATENT DOCUMENTS

| 0 434 396 A2 | 6/1991 | European Pat. Off. . |
| 62-283140 | 12/1987 | Japan . |
| 3-137121 | 6/1991 | Japan . |
| 4-133937 | 5/1992 | Japan . |
| 4133937 | 5/1992 | Japan . |
| 5-59222 | 3/1993 | Japan . |
| 5-188753 | 7/1993 | Japan . |
| 5-224501 | 9/1993 | Japan . |
| 6-167861 | 6/1994 | Japan . |
| 6-200158 | 7/1994 | Japan . |
| 6-208288 | 7/1994 | Japan . |
| 6-208289 | 7/1994 | Japan . |
| 6-250496 | 9/1994 | Japan . |

*Primary Examiner*—Edward J. Cain
*Attorney, Agent, or Firm*—Armstrong, Westerman, Hattori, McLeland & Naughton

[57] ABSTRACT

Conductive rubber compositions comprising a vulcanizate of a rubber component (A), a rubber component (B) vulcanized by a mechanism different from that in the rubber component (A), and conductive particles, a production process thereof, conductive rubber members making use of such a conductive rubber composition, a production process of the conductive rubber members, conductive rubber-covered rolls, and image forming apparatus equipped with the conductive rubber-covered roll are provided.

32 Claims, 1 Drawing Sheet

CONDUCTIVE RUBBER COMPOSITION AND PROCESS FOR THE PRODUCTION THEREOF

TECHNICAL FIELD

The present invention relates to conductive rubber compositions and a production process thereof, and more particularly to conductive rubber compositions capable of controlling the hardness and electric resistance values of products molded or formed therefrom within respective predetermined ranges, and a production process thereof. The conductive rubber compositions according to the present invention are particularly suitable for use as rubber materials for conductive rubber members such as conductive rolls and conductive blades used in image forming apparatus (electrostatic developing machines) such as electrophotographic copying machines and electrostatic recording apparatus.

BACKGROUND ART

A rubber vulcanizate (molded or formed product of conductive rubber) obtained by forming a rubber composition, in which conductive particles have been incorporated, into a predetermined shape and then vulcanizing it is required to control the hardness and electric resistance value thereof within respective predetermined ranges according to the use application thereof. However, the rubber vulcanizate containing the conductive particles has involved a problem that when a compounding proportion of the conductive particles is made high to achieve a sufficiently low electric resistance value, its hardness becomes too high. When the hardness thereof is controlled by adding a compounding ingredient such as a softener in a great amount, there is offered a problem that the compounding ingredient bleeds out into the surface of the molded or formed product of the conductive rubber. Accordingly, a difficult problem is encountered on the provision of a molded or formed product of conductive rubber, which combines good electrical conductivity with good softness.

When the desired properties cannot be achieve by only one rubber component, it is generally conducted to use a plurality of rubber materials in combination. Even when at least two rubber components are used in combination, however, it is difficult to obtain a molded or formed product of conductive rubber combining good electrical conductivity with good softness by an ordinary method in which vulcanizing agents corresponding to the respective rubber components are used to vulcanize the rubber components at the same time. More specifically, when the individual rubber components are compatible with each other, the hardness of the resulting molded or formed product becomes high because conductive particles are evenly dispersed in the rubber components. Even when the individual rubber components are incompatible with each other, the hardness of the resulting molded or formed product becomes high because the conductive particles are also evenly dispersed in the rubber components unless there is a particular difference in affinity for the conductive particles between the rubber components.

When the individual rubber components are incompatible with each other, and there is a difference in affinity for the conductive particles between the rubber components, the conductive particles come to exist at a higher concentration in the phase of the rubber component having higher affinity for the conductive particles. In this case, the phase of the rubber component having lower affinity for the conductive particles and containing the conductive particles at a lower concentration contributes to good softness. However, the kinds of usable rubber components are naturally limited in the method of controlling the electrical conductivity and softness by the difference in the affinity for the conductive particles, so that it is difficult to satisfy other properties such as abrasion resistance.

Conductive members such as conductive rolls and conductive blades used in image forming apparatus such as electrophotographic copying machines and electrostatic recording apparatus are required to combine good softness with good electrical conductivity. Therefore, the above-described problems will hereinafter be described in more detail taking the case of these conductive members.

Image forming apparatus such as electrophotographic copying machines and electrostatic recording apparatus are used in various kinds of image forming methods such as electrophotography, electrostatic photography and electrostatic printing. In these image forming apparatus, conductive rolls are used as, for example, a development roll, a charging roll, a transfer roll and the like. Besides, conductive blades are used as a blade (doctor blade) for forming a toner layer, a cleaning blade and the like.

Properties required of various rolls used in an image forming apparatus vary according to the kind of the image forming apparatus, use applications of the rolls, and the like. However, properties commonly required thereof generally include first to have moderate softness, second to exhibit an electric resistance value stable to changes in environment, third not to contaminate a photosensitive member and the like, and forth to have excellent durability.

These rolls are required to have, as an index to softness, a hardness ranging from 20 to 60° in terms of JIS-A hardness. If the hardness of these rolls is too high, such rolls tend to, for example, cause fusion bonding of a toner used in the image forming apparatus and damage a photosensitive member. If the hardness is too low, such rolls tend to, for example, fail to apply sufficient frictional force to the toner, and contaminate the photosensitive member. At the same time, these rolls are required to have an electric resistance value ranging from $1\times10^4$ to $1\times10^{10}$ Ω as an electrical property. For example, a development roll plays a role that a toner is caused to adhere to the peripheral surface of the development roll in a charged state by frictional force generated between the development roll and a developer feed roll, and the toner is evenly smoothed by a layer-forming blade and caused to fly toward an electrostatic latent image on the photosensitive member by electric attraction force. Therefore, the development roll must have an electric resistance value within a proper range. In the case of a charging roll, it fails to evenly charge the surface of the photosensitive member unless it has an electric resistance value within a proper range. In addition, such rolls are required to make less difference in electric resistance value between under high temperature and high humidity conditions of, for example, 35° C. and 80% RH (relative humidity) and under low temperature and low humidity conditions of, for example, 10° C. and 20% RH from the requirement for formation of a high-quality copy image, i.e., to have excellent environmental resistance and exhibit a stable electric resistance value even by changes in surrounding environmental conditions.

Therefore, in various image forming apparatus, conductive rubber materials which combine good softness with good electrical conductivity are used as materials for conductive rolls. As the conductive rubber materials, there are used rubber compositions obtained by incorporating conductive particles such as conductive carbon black into various kinds of rubber. To these conductive rubber materials, a softener and the like may be further added in some cases with a view toward satisfying the standard of softness, i.e., 20–60° in terms of JIS-A hardness.

As conductive rubber materials used in the above-described use applications, there have heretofore been proposed rubber compositions in which conductive particles are separately incorporated into, for example, silicone rubber (Japanese Patent Application Laid-Open No. 200158/1994), isoprene rubber (Japanese Patent Application Laid-Open No. 224501/1993), ethylene-propylene rubber (Japanese Patent Application Laid-Open No. 188753/1993) and polyhexene rubber (Japanese Patent Application Laid-Open No. 133937/1992). However, sufficient properties have not been yet achieved even by these conductive rubber materials. Besides, a conductive rubber material (Japanese Patent Application Laid-Open No. 190964/1991) in which two kinds of silicone rubber are used in combination as a rubber component, a contact-charging member (Japanese Patent Application Laid-Open No. 196067/1991) equipped with a conductive layer containing polyolefin rubber and silicone rubber, and the like have been proposed. However, these conductive rubber materials have drawbacks of insufficient abrasion resistance and poor durability.

By the way, conductive carbon black is most commonly used as the conductive particles. However, when the conductive carbon black is incorporated into conjugated diene rubber in a quantitative proportion sufficient to achieve the desired electrical conductivity, the hardness of the resulting vulcanized rubber may be increased to higher than 60° in terms of JIS-A hardness in some cases due to interaction between the conductive carbon black and the conjugated diene rubber. When a softener, flexibilizer or the like commonly used in the field of rubber materials is incorporated into a conductive rubber material, the hardness of the resulting rubber material can be controlled within a proper range. However, the compounding ingredient such as the softener bleeds out, so that problems of contamination of a photosensitive member, and the like arise.

It has been proposed to incorporate liquid rubber in a great amount in place of the softener or flexibilizer to control the hardness of the resulting conductive rubber material (Japanese Patent Application Laid-Open No. 59222/1993). In order to achieve sufficient softening action, however, it is necessary to incorporate the liquid rubber in a comparatively great amount into the conjugated diene rubber. Therefore, the molding and processing ability of the resulting rubber composition is deteriorated, and moreover a sticky feel is left on the surface of a molded product from the rubber composition due to low molecular weight substances in the liquid rubber.

In order to prevent the bleedout of compounding ingredients such as a softener, it has been proposed to, for example, provide a bleedout-preventing layer (Japanese Patent Application Laid-Open No. 250496/1994), a protective layer (Japanese Patent Application Laid-Open No. 208288/1994), or a surface layer (Japanese Patent Application Laid-Open No. 167861/1994), or laminate a resistance-regulating layer (Japanese Patent Application Laid-Open No. 208289/1994) on a rubber layer having good electrical conductivity. These methods are effective methods for preventing the bleedout, but unpreferable methods from the viewpoint of practical use because the number of steps is increased.

Accordingly, there is a demand for development of a conductive rubber material which has an electric resistance value within the desired range by containing a predetermined amount of conductive particles, permits controlling even its hardness within the above-described standard and can be used in the form of a single layer. Conductive blades are also required to have the same properties as in the conductive rolls. However, neither any conductive rubber material which sufficiently satisfies these requirements, nor any satisfactory conductive roll has existed.

DISCLOSURE OF THE INVENTION

It is an object of the present invention to provide a conductive rubber composition by which its hardness and electric resistance value can be controlled within respective predetermined ranges, and the kind of a rubber component can be selected according to the desired properties required, and a production process thereof.

Another object of the present invention is to provide a conductive rubber member such as a conductive roll or conductive blade making use of a conductive rubber composition having such features, and a production process thereof.

The present inventors have carried out an extensive investigation with a view toward overcoming the above-described problems involved in the prior art. As a result, it has been found that the above objects can be achieved by a conductive rubber composition comprising in combination two kinds of rubber materials, which are different in vulcanizing mechanism, and conductive particles. Specifically, a rubber composition comprising a vulcanizate of a rubber component (A), a rubber component (B) vulcanized by a mechanism different from that in the rubber component (A), and conductive particles can be used, thereby increasing the concentration of the conductive particles in the rubber component (B), whereby the electrical conductivity and hardness thereof can be controlled within respective predetermined ranges, and moreover the kinds of the individual rubber components can be selected from many rubber materials according to the desired properties required.

More specifically, when for example, a composition comprising a vulcanizate of a rubber component (A) such as epichlorohydrin-based rubber, a rubber component (B) having an unsaturated double bond, such as acrylonitrile-butadiene rubber, conductive particles, and a vulcanizing agent for the rubber component (B) is prepared, formed into a predetermined shape, and then vulcanized, a molded or formed product of conductive rubber can be obtained, in which (i) a microdomain structure composed of a vulcanizate phase of the rubber component (A) and a vulcanizate phase of the rubber component (B) is formed, (ii) the concentration of the conductive particles in the vulcanizate phase of the rubber component (B) is higher than that in the vulcanizate phase of the rubber component (A), and (iii) the molded or formed product retains predetermined electrical conductivity and moreover has predetermined softness due to the presence of the vulcanizate phase of the rubber component (A) containing the conductive particles at a lower concentration. According to this process, the rubber component (A) and the rubber component (B) can be selected from a wide variety of rubber materials, so that any other properties required can be fully satisfied.

In order to obtain the conductive rubber composition comprising the vulcanizate of the rubber component (A), it is only necessary, for example, to knead the rubber component (A), the rubber component (B), the conductive particles and a vulcanizing agent for the rubber component (A) and vulcanize only the rubber component (A). The vulcanization of the rubber component (A) according to this process is primary vulcanization by a dynamic vulcanizing method. It has been found that when the vulcanized rubber component (A) and the unvulcanized rubber component (B) coexist, the conductive particles are contained at a higher concentration in the rubber component (B). When a vulcanizing agent for the rubber component (B) is then added to vulcanize the component (B), a rubber vulcanizate containing the vulcanized rubber component (A) (vulcanizate phase) containing the conductive particles at a lower concentration and the vulcanized rubber component (B) (vulcanizate phase) containing the conductive particles at a higher concentration can be obtained. This rubber vulcanizate can be formed into the desired shapes prior to the vulcanization of the rubber component (B), thereby providing molded or formed products of conductive rubber (i.e., conductive rubber members) in various forms.

The molded or formed products of conductive rubber obtained by using the conductive rubber composition according to the present invention combine the desired softness with the desired electric resistance value and have excellent environmental resistance as to electric resistance value, and are hence particularly suitable for use in application fields such as conductive rolls and conductive blades used in an image forming apparatus. The present invention has been led to completion on the basis of these findings.

According to the present invention, there is thus provided a conductive rubber composition comprising a vulcanizate of a rubber component (A), a rubber component (B) vulcanized by a mechanism different from that in the rubber component (A), and conductive particles.

According to the present invention, there are also provided following inventions associated with one another.

1. A process for producing a conductive rubber composition, which comprises the steps of kneading a rubber component (A), a rubber component (B) vulcanized by a mechanism different from that in the rubber component (A), conductive particles, and a vulcanizing agent for the rubber component (A), and vulcanizing only the rubber component (A).

2. A process for producing a conductive rubber composition, which comprises the steps of kneading a rubber component (A), a rubber component (B) vulcanized by a mechanism different from that in the rubber component (A), a vulcanizing agent for the rubber component (A), and a part of conductive particles to be incorporated, vulcanizing only the rubber component (A), and then adding a vulcanizing agent for the rubber component (B) and the remainder of the conductive particles to be incorporated.

3. A process for producing a conductive rubber composition, which comprises the steps of kneading a rubber component (A), a rubber component (B) vulcanized by a mechanism different from that in the rubber component (A), and a vulcanizing agent for the rubber component (A), vulcanizing only the rubber component (A), and then adding a vulcanizing agent for the rubber component (B) and conductive particles.

4. A conductive rubber member comprising a vulcanizate of a rubber component (A), a vulcanizate of a rubber component (B) vulcanized by a mechanism different from that in the rubber component (A), and conductive particles.

5. A process for producing a conductive rubber member, which comprises the steps of kneading a rubber component (A), a rubber component (B) vulcanized by a mechanism different from that in the rubber component (A), conductive particles, and a vulcanizing agent for the rubber component (A), vulcanizing only the rubber component (A), adding and kneading a vulcanizing agent for the rubber component (B), forming the resultant mixture into the desired shape, and then vulcanizing the rubber component (B).

6. A process for producing a conductive rubber member, which comprises the steps of kneading a rubber component (A), a rubber component (B) vulcanized by a mechanism different from that in the rubber component (A), vulcanizing agent for the rubber component (A), and a art of conductive particles to be incorporated, vulcanizing only the rubber component (A), adding and kneading a vulcanizing agent for the rubber component (B), and the remainder of the conductive particles to be incorporated, forming the resultant mixture into the desired shape, and then vulcanizing the rubber component (B).

7. A process for producing a conductive rubber member, which comprises the steps of kneading a rubber component (A), a rubber component (B) vulcanized by a mechanism different from that in the rubber component (A), and a vulcanizing agent for the rubber component (A), vulcanizing only the rubber component (A), adding and kneading a vulcanizing agent for the rubber component (B), and conductive particles, forming the resultant mixture into the desired shape, and then vulcanizing the rubber component (B).

8. A conductive rubber-covered roll comprising a conductive mandrel, and a coating rubber layer containing conductive particles and formed on the peripheral surface of the mandrel, wherein the coating rubber layer comprises a vulcanizate of a rubber component (A), a vulcanizate of a rubber component (B) vulcanized by a mechanism different from that in the rubber component (A), and the conductive particles.

9. An image forming apparatus equipped with the conductive rubber-covered roll described above.

BEST MODE FOR CARRYING OUT THE INVENTION

Figure 1:
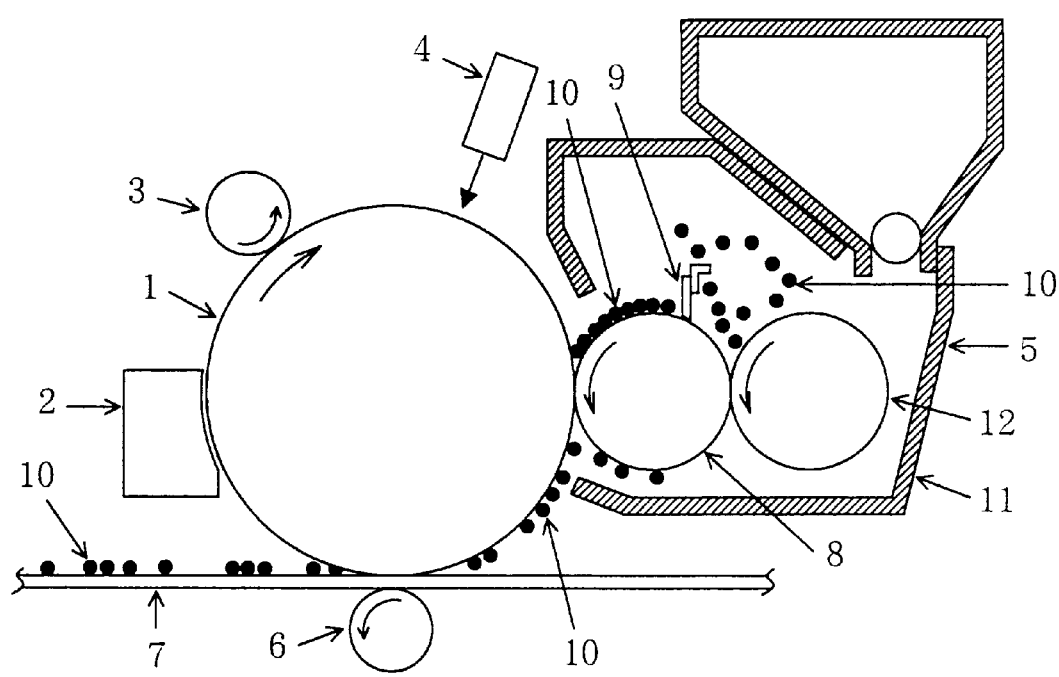
FIG. 1 is a cross-sectional view illustrating an embodiment of an image forming apparatus equipped with a conductive roll according to the present invention as, for example, a development roll, charging roll or transfer roll.

Rubber component (A):

As examples of a rubber material for the rubber component (A) useful in the practice of the present invention, may be mentioned epichlorohydrin-based rubber, epoxy group-containing rubber, acrylic rubber, chloroprene rubber, ethylene-acrylate rubber, urethane rubber, chlorosulfonated polyethylene rubber, butyl rubber and fluororubber. As examples of the epichlorohydrin-based rubber, may be mentioned epichlorohydrin rubber (CHR), epichlorohydrin-ethylene oxide rubber (CHC) and epichlorohydrin-propylene oxide rubber. As examples of the epoxy group-containing rubber, may be mentioned epoxidized acrylic rubber (epoxy group-containing ACM) obtained by copolymerizing an epoxy group-containing monomer such as glycidyl methacrylate or allyl glycidyl ether; epoxidized ethylene-acrylate rubber obtained by copolymerizing an epoxy group-containing monomer such as glycidyl methacrylate or allyl glycidyl ether; and epoxidized diene rubber obtained by epoxy-modifying natural rubber, IR, SBR, NBR or the like. These kinds of rubber may be used either singly or in any combination thereof. Of these, rubber having an epoxy group and/or a halogen atom in its molecular chain is preferred in that preferable physical properties are easy to obtain, with epoxy group-containing ACM, CHR and CHC being particularly preferred.

The rubber component (A) is rubber vulcanizable with a vulcanizing agent which cannot vulcanize the rubber component (B) and can be vulcanized with any other vulcanizing agent than vulcanizing agents for the rubber component (B) such as sulfur, sulfur donors and organic peroxides.

Rubber component (B):

As examples of a rubber material for the rubber component (B) useful in the practice of the present invention, may be mentioned rubbers having an unsaturated double bond, such as acrylonitrile-butadiene rubber (NBR), acrylonitrile-isoprene rubber, acrylonitrile-butadiene-isoprene rubber, styrene-butadiene rubber (SBR), butadiene rubber (BR), isoprene rubber (IR), natural rubber (NR), ethylene-propylene-diene rubber (EPDM), butyl rubber (IIR) and partially hydrogenated products thereof. As examples of the partially hydrogenated products, may be mentioned hydrogenated NBR and hydrogenated SBR. These kinds of rubber may be used either singly or in any combination thereof. Of these, NBR having high strength is particularly preferred. The rubber material for the rubber component (B) is generally solid at ordinary temperature. However, when a molded or formed product of rubber having a particularly low hardness is desired to obtain, a small amount (not higher than 10 wt. % based on the whole rubber component) of liquid rubber may be incorporated.

A compounding proportion of the rubber component (A) in the whole rubber component is generally 20–80 wt. %, preferably 30–75 wt. %, more preferably 40–70 wt. %. A compounding proportion of the rubber component (B) in the whole rubber component is generally 80–20 wt. %, preferably 70–25 wt. %, more preferably 60–30 wt. %. If the compounding proportion of the rubber component (A) is too low, it is difficult to obtain a conductive resin composition having the desired softness (hardness). If the proportion is too high, the strength of the resulting rubber vulcanizate is lowered.

These rubber components may be blended by an ordinary kneading method making use of rolls, an extruder, a Banbury mixer or the like. However, there may also be used a method in which respective slurries obtained by emulsion polymerization or suspension polymerization are mixed with each other to co-coagulate them.

Conductive particles:

The conductive particles useful in the practice of the present invention are those having a volume resistivity value not higher than $10^6$ Ω·cm, and examples thereof may include carbon type conductive fillers such as conductive carbon black and graphite; powders of metals such as silver, nickel and copper; those obtained by subjecting non-conductive powder to a coating treatment with a metal such as silver, or a metal oxide such as tin oxide; and metal oxides. Of these, conductive carbon black is preferred because it does not damage any photoconductive member.

As examples of the conductive carbon black, may be mentioned acetylene black, conductive furnace black, super conductive furnace black, extra conductive furnace black, conductive channel black, furnace black heat-treated at a high temperature, and channel black. Preferable examples of commercially available products thereof may include Ketjen black EC and Ketjen black EC-600JD (products of Ketjen black International Co.) which are a sort of furnace black. Besides these kinds of carbon black having excellent electrical conductivity, carbon black having relatively low electrical conductivity, such as HAF, ISAF, SAF, SRF, MAF or FEF may also be used.

These conductive particles may be used either singly or in any combination thereof. In some cases, it may be preferable that the degree of electrical conductivity be controlled by using carbon black having high electrical conductivity and carbon black having low electrical conductivity in combination at a varied quantitative ratio.

The compounding proportion of the conductive particles is generally 1–100 parts by weight, preferably 3–80 parts by weight, more preferably 5–70 parts by weight per 100 parts by weight of the rubber component (B). If the compounding proportion of the conductive particles is too low, the desired electric resistance value cannot be achieved. If the proportion is too high, the resulting rubber composition tends to have a too low electric resistance value and a too high hardness. The conductive particles are generally kneaded into the rubber component by means of rolls, an extruder, a Banbury mixer or the like.

Vulcanizing agent for rubber component (A):

The rubber component (A) and the rubber component (B) are rubber materials vulcanized by different vulcanizing mechanisms from each other. In the present invention, both vulcanizing agent for the rubber component (A) and vulcanizing agent for the rubber component (B) are used as vulcanizing agents.

As the vulcanizing agent for the rubber component (A), are used those which do not vulcanize the rubber component (B) under vulcanizing conditions of the rubber component (A).

Vulcanizing agents for the epichlorohydrin-based rubber as the rubber component (A) may include polyamines, 2-mercaptoimidazolines, 2-mercaptopyrimidines, mercaptotriazines and thioureas. The polyamines include ethylenediamine, hexamethylenediamine and salts thereof. The 2-mercaptoimidazolines include 2-mercaptoimidazoline, 4-methyl-2-mercaptoimidazoline and 5-ethyl-4-butyl-2-mercaptoimidazoline. The mercaptotriazines include 1,3,5-trithiocyanuric acid and 2-butylamino-4,6-dimercapto-s-triazine. The thioureas include thiourea, dibutylthiourea and triethylthiourea.

As vulcanizing agents for the epoxy group-containing rubber, may be generally used vulcanizing agent systems such as amine compounds and salt thereof, and isocyanate compounds, which use an epoxy group as a crosslinking point. Examples of the amine compounds and salts thereof may include isocyanuric acid, octadecyltrimethylammonium bromide, diphenylurea, hexamethylenetetramine, p,p'-diaminodiphenylmethane, ammonium salts of organic carboxylic acids, such as ammonium benzoate, hexamethylenediamine carbamate, N,N'-dicinnamylidene-1,6-hexadiamine, and 4,4'-methylenebis-(2-chloroaniline). Examples of the isocyanate compounds may include polyisocyanates such as toluylenediisocyanate, diphenylmethanediisocyanate and naphthylene-1,5-diisocyanate.

As examples of vulcanizing agents for the acrylic rubber and ethylene-acrylate rubber, may be mentioned amine compounds such as triethylenetetramine, triethyltrimethylenetriamine and hexamethylenediamine carbamate.

As examples of vulcanizing agents for the chloroprene rubber, may be mentioned zinc oxide and magnesium oxide. 2-Mercaptoimidazoline or the like may be used in combination as a vulcanization accelerator.

As examples of vulcanizing agents for the urethane rubber, may be mentioned bismaleimide and biscitraconamide. As examples of vulcanizing agents for the chlorosulfonated polyethylene rubber, may be mentioned magnesium oxide, lead monoxide, lead maleate trichloride, abietic acid and hydrogenated rosin. As examples of vulcanizing agents for the butyl rubber, may be mentioned quinone type crosslinking agents such as p-benzoquinone dioxime and benzoylquinone dioxime, and crosslinking agents for resins. As examples of vulcanizing agents for the fluororubber, may be mentioned hexamethylenediamine carbamate and ethylenediamine carbamate.

The compounding proportion of these vulcanizing agents varies according to the kinds of the rubber component (A) and vulcanizing agent used, but is generally 1–15 parts by weight, preferably 2–10 parts by weight per 100 parts by weight of the rubber component (A). The vulcanizing agents may be used either singly or in any combination thereof. When plural kinds of rubber are used in combination as the rubber component (A), plural kinds of vulcanizing agents are used according to the kinds of the rubber materials used.

Vulcanizing agent for rubber component (B):

As examples of vulcanizing agents for the rubber component (B), may be mentioned sulfur, sulfur donors and organic peroxides. Examples of the sulfur donors may include thiurams such as tetramethylthiuram disulfide and tetrabutylthiuram disulfide. Examples of the organic peroxides may include dicumyl peroxide, di-t-butyl peroxide, p-methane hydroperoxide and cumene hydroperoxide.

As vulcanizing agents for EPDM as the rubber component (B), may be used sulfur, sulfur donors, quinone type crosslinking agents, organic peroxides and crosslinking agent systems for resins.

The compounding proportion of these vulcanizing agents varies according to the kinds of the rubber component and vulcanizing agent used, but is generally 0.5–15 parts by weight, preferably 1–10 parts by weight per 100 parts by weight of the rubber component (B).

In the present invention, various kinds of compounding agents for rubber, such as vulcanization accelerators such as dithiocarbamates, thiurams, guanidienes and thiazoles, vulcanization aids such as stearic acid and metal oxides, and antioxidants may be incorporated as needed. Dispersing agents for evenly dispersing the conductive particles may also be incorporated so far as they do not contaminate any photosensitive drum.

Conductive rubber composition and production process thereof:

In the present invention, a conductive rubber composition (1) comprising a vulcanizate of the rubber component (A), the rubber component (B) vulcanized by a mechanism different from that in the rubber component (A), and the conductive particles can be obtained by kneading the rubber component (A), the rubber component (B), the conductive particles, and the vulcanizing agent for the rubber component (A), and vulcanizing only the rubber component (A). More specifically, in the course of kneading the rubber materials and the conductive particles, the vulcanizing agent for the rubber component (A) is added to conduct primary vulcanization, thereby preparing the conductive rubber composition containing a vulcanizate of the rubber component (A), the rubber component (B) and the conductive particles. When plural kinds of rubber are used as the rubber component (A), a process of adding a vulcanizing agent according to each of the rubber materials and heating and vulcanizing the rubber material is conducted necessary times.

This step of the primary vulcanization is a vulcanizing step by the so-called dynamic vulcanization. The dynamic vulcanization can be performed by adding the vulcanizing agent for the rubber component (A) upon kneading the individual components by means of a kneading machine such as a Banbury mixer and then heating them, thereby vulcanizing the rubber component (A). When plural kinds of rubber materials are used as the rubber component (A), the primary vulcanization may be performed plural times. With respect to vulcanization conditions such as heating, ordinary conditions may be adopted according to the kinds of the individual rubber components.

By this primary vulcanization step, the vulcanized rubber component (A) and the unvulcanized rubber component (B) come to coexist in the rubber composition, whereby the conductive particles come to exist in a greater amount in the unvulcanized rubber component (B). The conductive particles are contained scarcely in the vulcanized rubber component (A). Alternatively, they are contained at a content lower than the average content.

The conductive particles may not be mixed in the primary vulcanization step but incorporated after the primary vulcanization step. Alternatively, a part of the conductive particles to be incorporated may be mixed in the primary vulcanization step, and the remainder thereof may be additionally incorporated after the primary vulcanization step. According to these processes, the content of the conductive particles in the rubber component (B) can be enhanced.

In any process, the conductive rubber composition (1) comprising a vulcanizate of the rubber component (A), the rubber component (B) and the conductive particles can be obtained after the primary vulcanization step. The vulcanizing agent for the rubber component (B) is then incorporated in the conductive rubber composition (1), thereby preparing a conductive rubber composition (2). When the whole amount or the remainder of the conductive particles is incorporated after the primary vulcanization step, said conductive particles may be incorporated at the same time as the incorporation of the vulcanizing agent for the rubber component (B). The rubber composition (2) prepared in such a manner is kneaded, formed into the desired shape and then subjected to secondary vulcanization, thereby obtaining a vulcanizate (molded or formed product of conductive rubber). With respect to vulcanization conditions such as heating temperature, ordinary conditions may be adopted according to the kind of the rubber component (B).

In the conductive rubber composition (2), the vulcanized rubber component (A) is evenly dispersed in the unvulcanized rubber component (B). The composition may be formed into the desired shape by, for example, extrusion or press molding. As a method for preparing the rubber composition (2) containing the vulcanizing agent for the rubber component (B), may be adopted an ordinary kneading process. The rubber composition (2) prepared in such a manner can be molded or formed into the desired shape such as a plate or cylindrical form using a method such as extrusion or press molding. When a conductive rubber-covered roll is formed with the rubber composition (2), the composition is extruded on the peripheral surface of a conductive mandrel. The rubber composition (2) formed into the desired shape is subjected to secondary vulcanization with the vulcanizing agent for the rubber component (B). As a result, all the rubber components are vulcanized.

When a conductive roll or conductive blade, which will be described subsequently, is produced by adopting such a two-stage process, a rubber vulcanizate, which has an electric resistance value of generally $10^3$–$10^{10}$ Ω, preferably $10^4$–$10^9$ Ω, more preferably $10^5$–$10^8$ Ω and makes less difference in electric resistance value between under high temperature and high humidity conditions of 35° C. and 80% RH and under low temperature and low humidity conditions of 10° C. and 20% RH, can be obtained. Further, a molded or formed product of conductive rubber having a hardness of generally 20–60°, preferably 25–50°, more preferably 30–45° in terms of JIS-A hardness can be obtained by using such a two-stage process.

When only the rubber component (B) is used in an attempt to achieve the desired electric resistance value, the resulting molded or formed product of rubber tends to have a higher JIS-A hardness. Even when the rubber component (B) and the rubber component (A) are used in combination as a rubber component, the composition has deteriorated processability and the resulting molded or formed product also tends to have a higher electric resistance value if the composition is vulcanized by one-stage process without vulcanizing and molding or forming the composition through the above primary vulcanization step and secondary vulcanization step. When vulcanization is conducted by the two-stage process according to the present invention, the content of the conductive particles in the rubber component (B) becomes higher, and the electric resistance value of the resulting molded or formed product hence becomes lower. However, the contents of the conductive particles in the rubber components (A) and (B) are the same when vulcanization is conducted by the one-stage process even though the compounding proportion of the conductive particles is the same, so that the JIS-A hardness of the resulting molded or formed product becomes low, but its electric resistance value becomes high. In order to lower the electric resistance value by using both rubber component (A) and rubber component (B) and vulcanizing them by the one-stage process, it is necessary to enhance the compounding proportion of the conductive particles. As a result, the hardness becomes high. When the concentration of the conductive particle in the rubber component (B) is made higher than that in the rubber component (A) according to the process of the present invention, there is an advantage that the hardness and electric resistance value can be controlled within respective predetermined ranges.

More specifically, when the two-stage vulcanization process is adopted, a molded or formed product of conductive rubber can be obtained, in which (i) a microdomain structure composed of a vulcanizate phase of the rubber component (A) and a vulcanizate phase of the rubber component (B) is formed, (ii) the concentration of the conductive particles in the vulcanizate phase of the rubber component (B) is higher than that in the vulcanizate phase of the rubber component (A), and (iii) the molded or formed product retains predetermined electrical conductivity and moreover has predetermined softness due to the presence of the vulcanizate phase of the rubber component (A) containing the conductive particles at a lower concentration. The fact that the concentration of the conductive particles in the vulcanizate phase of the rubber component (B) becomes higher than that in the vulcanizate phase of the rubber component (A) by the two-stage vulcanization process is apparent from the fact that when the electric resistance values of a vulcanizate obtained by the one-stage vulcanization process and a vulcanizate obtained by the two-stage vulcanization process, both, in the same composition are compared with each other, the electric resistance value of the latter vulcanizate is lowered to a great extent.

The rubber vulcanizates according to the present invention have moderate softness without containing any additive such as a softener, which bleeds out to contaminate a photosensitive member, in the conductive rubber composition. They also have no need to form a special laminated structure for preventing the bleedout of additive components. Accordingly, the molded or formed products of conductive rubber according to the present invention may be used in direct contact with a photosensitive member as, for example, charging rolls, and in the form of a single-layer roll, and can hence be produced more easily than any laminated roll.

The conductive members according to the present invention can be coated on its surface with a resin or the like. In order to lower frictional resistance on their surfaces, they may also be subjected to ultraviolet-light irradiation.

The molded or formed products of conductive rubber according to the present invention can be used as conductive members, such as conductive rolls such as development rolls, charging rolls and transfer rolls, or conductive blades such as blades for forming a toner layer and cleaning blades, which are all used in image forming apparatus such as electrophotographic copying machines and electrostatic recording apparatus. Besides these members, the molded or formed products of conductive rubber may also be useful as various belts in the electrophotographic copying machines. Further, the molded or formed products of conductive rubber according to the present invention may also be used as surface-protecting layers and resistance-regulating layers for various rubber covered rolls in the image forming apparatus.

Image forming apparatus:

A specific example of an image forming apparatus equipped with conductive rubber-covered rolls and the like formed with the conductive rubber composition according to the present invention will be described.

Illustrated in FIG. 1 is a cross-sectional view of an illustrative image forming apparatus. In this image forming apparatus, a photosensitive drum 1 as an image-bearing member is installed rotatably in the direction of an arrow. The photosensitive drum 1 generally has a structure that a photoconductive layer (photosensitive layer) is provided around the peripheral surface of an electroconductive support drum. The photoconductive layer is composed of, for example, an organic photosensitive member, selenium photosensitive member, zinc oxide photosensitive member or amorphous silicon photosensitive member.

Around the photosensitive drum 1, a charging means 3, a latent image forming means 4, a developing means 5, a transfer means 6 and a cleaning means 2 are arranged along the circumferential direction of the drum. The charging means 3 bears an action that the surface of the photosensitive drum 1 is evenly charged either positively or negatively. As the charging means 3, a charging roll is illustrated in FIG. 1. Besides the charging roll, for example, a charging blade or a corona discharge device may be used. The latent image forming means 4 bears an action that light corresponding to image signals is applied on the predetermined pattern to the surface of the photosensitive drum evenly charged to form an electrostatic latent image on the exposed portion of the drum (reversal development system) or form an electrostatic latent image on the unexposed portion of the drum (normal development system). The latent image forming means 4 is composed of, for example, a combination of a laser device and an optical system, or a combination of an LED array and an optical system.

The developing means 5 bears an action that a developer (toner) is applied to the electrostatic latent image formed on the surface of the photosensitive drum 1. The developing means 5 is generally a developing device equipped with a development roll 8, a blade 9 for development roll, a receiving means (container casing) 11 for a developer 10 and a developer supply means (feed roll) 12. The development roll 8 is arranged in opposition to the photosensitive drum 1 and generally in close vicinity to the photosensitive drum 1 in such a manner that a part thereof comes into contact with the photosensitive drum 1, and is rotated in a direction opposite to the rotating direction of the photosensitive drum 1. The feed roll 12 is rotated in contact with and in the same direction as the development roll 8 to supply the toner 10 to the outer periphery of the development roll 8. When the development roll 8 is rotated in the developing device, the toner 10 within the developer receiving means 11 adheres to the peripheral surface of the development roll 8 owing to electrostatic force generated by friction, or the like. The blade 9 for development roll comes into contact with the peripheral surface of the rotating development roll 8 to control the layer thickness of a toner layer formed on the peripheral surface of the development roll 8. Bias voltage is applied between the development roll 8 and the photosensitive drum 1 in such a manner that the toner is caused to adhere only to a light-exposed portion of the photosensitive drum 1 in a reversal development system, or only to a light-unexposed portion of the photosensitive drum 1 in a normal development system.

The transfer means 6 serves to transfer a toner image formed on the surface of the photosensitive drum 1 by the developing means 5 to a transfer medium (transfer paper) 7. A transfer roll is illustrated in FIG. 1. Besides the transfer roll, for example, a transfer belt or a corona discharge device may be used. The cleaning means 2 serves to clean off the toner remaining on the surface of the photosensitive drum 1 and is composed of, for example, a cleaning blade. This cleaning means is not always required in the case of a system that cleaning action is conducted at the same time as development.

According to the present invention, there is thus provided an image forming apparatus equipped with an image-bearing member, a charging means, a latent image forming means, a developing means and a transfer means, wherein the above-described conductive rubber-covered roll is arranged as at least one of a charging roll as the charging means, a development roll in the developing means, and a transfer roll as the transfer means.

It goes without saying that an image forming apparatus, in which conductive rubber blades formed from the conductive rubber composition according to the present invention are arranged as various blades, can also be provided.

EXAMPLES

The present invention will hereinafter be described more specifically by the following Examples and Comparative Examples. However, the present invention is not limited to these examples only. Incidentally, all designations of "part" or "parts" as to compounding proportions as will be used in the following examples mean part or parts by weight.

Physical properties were determined in accordance with the following respective methods.

(1) Electric resistance value:

Electrodes were brought into separate contact with a mandrel (shaft) and the surface of a roll to measure an electric resistance value of a material for the roll. One electrode was connected to a metal shaft, and the other electrode was connected to a metal plate. The roll was brought into contact with this metal plate in a state that a load of 250 g had been applied to both ends of the shaft of the roll, thereby measuring the electric resistance value. The measurement voltage was 250 V. As a measuring device, was used a Megaohm Tester 3119 Model manufactured by Hioki Denki K. K.. The measurement was performed under environmental conditions of ①10° C. and 20% RH, ②23° C. and 50% RH, and ③35° C. and 80% RH. After the sample was left over for 48 hours in the respective environments, its electric resistance value was determined in the respective environments.

(2) Processability:

Easy removal from a mold was used as an index to processability to evaluate each sample as to the processability in accordance with the following standard:

◯: Easy to remove from a mold; and

X: Poor in releasability and hard to remove from a mold.

Example 1

Used were epoxy group-containing acrylic rubber as a rubber component (A), NBR and liquid NBR as a rubber component (B), conductive carbon black (Ketjen black EC, product of Ketjen black International Co.) as conductive particles, and isocyanuric acid, octadecyltrimethylammonium bromide and diphenylurea as vulcanizing agents (primary vulcanizing agents) for the rubber component (A), and further stearic acid as a vulcanization accelerator.

The individual components were charged into a Banbury mixer in their corresponding compounding proportions shown in Table 1 to knead them, and at this time, they were heated to 150° C. to conduct vulcanization (primary vulcanization) of the epoxy group-containing acrylic rubber of the rubber component (A). The compounding proportion of the conductive particles amounts to 10 parts per 100 parts of the component (B).

Dicumyl peroxide as a vulcanizing agent (secondary vulcanizing agent) for the rubber component (B) was then added and kneaded in its corresponding proportion shown in Table 1. The kneaded mixture was extruded around a stainless steel-made mandrel of 8 mm in diameter and 280 mm in width and heated at 160° C. for 30 minutes to conduct vulcanization (secondary vulcanization) of the rubber component (B), thereby obtaining a formed product in the form of a roll. The surface of the formed product thus obtained was polished to obtain a conductive rubber-covered roll of 20 mm in diameter and 250 mm in width. The result is shown in Table 1.

Example 2

Primary vulcanization, extrusion and secondary vulcanization were performed in the same manner as in Example 1 except that compounding proportions of the individual components were changed as shown in Table 1, thereby producing a conductive rubber-covered roll. The result is shown in Table 1.

Example 3

A conductive rubber-covered roll was produced in the same manner as in Example 2 except that the conductive particles were changed from Ketjen black EC to HAF carbon (Sheathed #3, product of Tokai Carbon Co., Ltd.) and used in a proportion of 40 parts per 100 parts of NBR. The result is shown in Table 1.

Comparative Example 1

Individual components were kneaded in one lot in their corresponding compounding proportions shown in Table 1, and the kneaded mixture was extruded around a stainless steel-made mandrel of 8 mm in diameter and 280 mm in width without conducting primary vulcanization of the epoxy group-containing acrylic rubber component, and heated at 160° C. for 30 minutes, thereby vulcanizing the rubber components. The surface of the roll-like formed product thus obtained was polished to obtain a conductive rubber-covered roll of 20 mm in diameter and 250 mm in width. The result is shown in Table 1.

Comparative Example 2

Only NBR was used as a rubber component, and individual components were kneaded in one lot in their corresponding compounding proportions shown in Table 1. The kneaded mixture was extruded around a stainless steel-made mandrel of 8 mm in diameter and 280 mm in width and heated at 160° C. for 30 minutes, thereby vulcanizing the rubber component. The surface of the roll-like formed product thus obtained was polished to obtain a conductive rubber-covered roll of 20 mm in diameter and 250 mm in width. The result is shown in Table 1.

for the rubber component (A), and tetramethylthiuram disulfide as a vulcanizing agent for the rubber component (B).

The respective rubber components, conductive particles, stearic acid (0.5 parts) and the primary vulcanizing agent were kneaded in its corresponding formulation shown in Table 2 by means of a Banbury mixer, and at this time, they were heated to 150° C. to conduct vulcanization (primary vulcanization) of the epichlorohydrin rubber component. The secondary vulcanizing agent and stearic acid (3.0 parts) were then added, and the resultant mixture was kneaded again. The kneaded mixture was extruded around a stainless steel-made mandrel of 8 mm in diameter and 280 mm in width and heated at 160° C. for 30 minutes to conduct vulcanization (secondary vulcanization) of the rubber component (B), thereby obtaining a formed product in the form of a roll. The surface of the formed product thus obtained was polished to obtain a conductive rubber-covered roll of 20 mm in diameter and 250 mm in width. The result is shown in Table 2.

Comparative Example 3

Individual components were kneaded in one lot in their corresponding compounding proportions shown in Table 2,

TABLE 1

| | Example | | | Comp. Example | |
|---|---|---|---|---|---|
| | 1 | 2 | 3 | 1 | 2 |
| Rubber component | | | | | |
| (B) NBR (*1) | 45 | 34 | 34 | 45 | 100 |
| (B) NBR (*2) | 5 | 6 | 6 | 5 | — |
| (A) Epoxy group— containing acrylic rubber (*3) | 50 | 60 | 60 | 50 | — |
| Conductive particles (*4) | 5 | 4 | — | 5 | 4 |
| Conductive particles (*5) | — | — | 16 | — | — |
| Stearic acid | 2 | 2 | 2 | 2 | 2 |
| Primary vulcanizing agent | | | | | |
| Zeonet A (*6) | 0.36 | 0.43 | 0.43 | — | — |
| Zeonet B (*7) | 1.08 | 1.30 | 1.30 | — | — |
| Zeonet U (*8) | 0.78 | 0.94 | 0.94 | — | — |
| Secondary vulcanizing agent | 1.0 | 0.8 | 0.8 | 2.0 | 2.0 |
| Percurryl D-40 (*9) | | | | | |
| Electric resistance value | | | | | |
| 10° C., 20% | $4.6 \times 10^5$ | $8.1 \times 10^6$ | $1.1 \times 10^7$ | $2.3 \times 10^{10}$ | $<10^4$ |
| 23° C., 50% | $2.5 \times 10^5$ | $6.2 \times 10^6$ | $7.9 \times 10^6$ | $5.6 \times 10^9$ | $<10^4$ |
| 35° C., 80% | $1.5 \times 10^5$ | $4.4 \times 10^6$ | $6.0 \times 10^6$ | $1.6 \times 10^9$ | $<10^4$ |
| JIS A hardness | 38 | 34 | 44 | 33 | 63 |
| Processability | ○ | ○ | ○ | x | ○ |

(Note)
(*1) Nipol DN401LL, product of Nippon Zeon Co., Ltd.
(*2) Nipol DN601, product of Nippon Zeon Co., Ltd.
(*3) AR 53L, product of Nippon Zeon Co., Ltd.
(*4) Ketjen black EC, product of Ketjen black International Co.
(*5) HAF carbon (Sheathed #3, product of Tokai Carbon Co., Ltd.)
(*6) Isocyanuric acid
(*7) Octadecyltrimethylammonium bromide
(*8) Diphenylurea
(*9) Dicumyl peroxide (diluted to 40% with calcium carbonate)

Example 4

Used were epichlorohydrin-ethylene oxide rubber (CHC) as a rubber component (A), NBR as a rubber component (B), 2-mercaptoimidazoline and red lead as vulcanizing agents and the kneaded mixture was extruded around a stainless steel-made mandrel of 8 mm in diameter and 280 mm in width without conducting primary vulcanization of the epichlorohydrin rubber component and heated at 160° C. for 30 minutes, thereby vulcanizing the rubber components. The surface of the roll-like formed product thus obtained was polished to obtain a conductive rubber-covered roll of 20 mm in diameter and 250 mm in width. The result is shown in Table 2.

TABLE 2

|  | Example 4 | Comp. Ex. 3 |
|---|---|---|
| Rubber component |  |  |
| (B) NBR (*1) | 34 | 34 |
| (B) NBR (*2) | 6 | 6 |
| (A) CHC (*10) | 60 | 60 |
| Conductive particles (*4) | 4 | 4 |
| Stearic acid | 0.5/3.0 | 2 |
| Primary vulcanizing agent For CHC (*11) | 1.5 | — |
| Secondary vulcanizing value For NBR (*12) | 0.8 | 0.8 |
| Electric resistance value |  |  |
| 10° C., 20% | $8.2 \times 10^6$ | $5.1 \times 10^9$ |
| 23° C., 50% | $7.7 \times 10^6$ | $2.2 \times 10^9$ |
| 35° C., 80% | $6.8 \times 10^6$ | $1.4 \times 10^9$ |
| JIS A hardness | 31 | 61 |
| Processability | ○ | ○ |

(Note)
(*1) Nipol DN401LL, product of Nippon Zeon Co., Ltd.
(*2) Nipol DN601, product of Nippon Zeon Co., Ltd.
(*4) Ketjen black EC, product of Ketjen black International Co.
(*10) Epichlorohydrin-ethylene oxide rubber: GECHRON 2000, product of Nippon Zeon Co., Ltd.
(*11) 1.5 Parts of 2-mercaptoimidazoline and 3.0 parts of red lead
(*12) Tetramethylthiuram disulfide Examples 5–8

Primary vulcanization, extrusion and secondary vulcanization were performed in the same manner as in Example 2 except that the rubber component (B) was changed to their corresponding rubber components shown in Table 3, thereby producing conductive rubber-covered rolls. The results are shown in Table 3.

TABLE 3

|  | Example | | | |
|---|---|---|---|---|
|  | 5 | 6 | 7 | 8 |
| Rubber component |  |  |  |  |
| (B) NBR (*1) | 40 | — | — | — |
| (B) SBR (*13) | — | 40 | — | — |
| (B) BR (*14) | — | — | 40 | — |
| (B) EPDM (*15) | — | — | — | 40 |
| (A) Epoxy group-containing acrylic rubber (*3) | 60 | 60 | 60 | 60 |
| Conductive particles (*4) | 4 | 4 | 4 | 4 |
| Stearic acid | 2 | 2 | 2 | 2 |
| Primary vulcanizing agent |  |  |  |  |
| Zeonet A (*6) | 0.43 | 0.43 | 0.43 | 0.43 |
| Zeonet B (*7) | 1.30 | 1.30 | 1.30 | 1.30 |
| Zeonet U (*8) | 0.94 | 0.94 | 0.94 | 0.94 |
| Secondary vulcanizing agent Percumyl D-40 (*9) | 1.0 | 0.8 | 0.4 | 2.0 |

TABLE 3-continued

|  | Example | | | |
|---|---|---|---|---|
|  | 5 | 6 | 7 | 8 |
| Electric resistance value |  |  |  |  |
| 10° C., 20% | $3.5 \times 10^7$ | $1.3 \times 10^7$ | $9.4 \times 10^5$ | $2.1 \times 10^6$ |
| 23° C., 50% | $1.2 \times 10^7$ | $8.9 \times 10^6$ | $9.0 \times 10^5$ | $9.8 \times 10^5$ |
| 35° C., 80% | $1.2 \times 10^7$ | $7.1 \times 10^6$ | $6.3 \times 10^5$ | $8.2 \times 10^5$ |
| JIS A hardness | 36 | 38 | 31 | 39 |
| Processability | ○ | ○ | Δ | ○ |

(Note)
(*1) Nipol DN401LL, product of Nippon Zeon Co., Ltd.
(*3) AR 53L, product of Nippon Zeon Co., Ltd.
(*4) Ketjen black EC, product of Ketjen black International Co.
(*6) Isocyanuric acid
(*7) Octadecyltrimethylammonium bromide
(*8) Diphenylurea
(*9) Dicumyl peroxide (diluted to 40% with calcium carbonate)
(*13) Nipol 1502, product of Nippon Zeon Co., Ltd.
(*14) Nipol BR1220, product of Nippon Zeon Co., Ltd.
(*15) Esprene 505A product of Sumitomo Chemical Co., Ltd.

INDUSTRIAL APPLICABILITY

According to the present invention, there are provided conductive rubber compositions by which their hardness and electric resistance values can be controlled within respective predetermined ranges, and the kind of a rubber component can be selected according to the desired properties required, and a production process thereof. The conductive rubber compositions according to the present invention are suitable for use in application fields such as conductive rolls and conductive blades used in image forming apparatus such as electrophotographic copying machines and electrostatic recording apparatus. The conductive rubber members according to the present invention have a softness and an electric resistance within the respective desired ranges and have excellent environmental resistance as to electric resistance. The conductive rubber members according to the present invention have moderate softness without containing any additive such as a softener, which bleeds out to contaminate a photosensitive member, in the conductive rubber composition, and have no need to form a special laminated structure for preventing the bleedout of additive components.

What is claimed is:

1. A conductive rubber composition comprising a vulcanizate of a rubber component (A), a rubber component (B) vulcanized by a mechanism different from that in the rubber component (A), and conductive particles, wherein the vulcanizate of the rubber component (A) is vulcanized with a vulcanizing agent which can not vulcanize the rubber component (B) under the vulcanizing conditions of the rubber (A), and wherein the vulcanizate of the rubber component (A) is dispersed in the rubber component (B), and at least the rubber component (B) contains the conductive particles.

2. The conductive rubber composition according to claim 1, which further comprises a vulcanizing agent for the rubber component (B).

3. The conductive rubber composition according to claim 1, wherein the rubber component (A) is rubber vulcanizable with any other vulcanizing agent than vulcanizing agents selected from among sulfur, sulfur donors and organic peroxides.

4. The conductive rubber composition according to claim 1, wherein the rubber component (A) is rubber having an epoxy group or a halogen atom in its molecular chain.

5. The conductive rubber composition according to claim 4, wherein the rubber having an epoxy group or a halogen atom in its molecular chain is at least one rubber selected from the group consisting of epichlorohydrin rubber, epichlorohydrin-ethylene oxide rubber, epichlorohydrin-propylene oxide rubber and epoxy group-containing acrylic rubber.

6. The conductive rubber composition according to claim 1, wherein the rubber component (B) is rubber having an unsaturated double bond not corresponding to the rubber component (A).

7. The conductive rubber composition according to claim 6, wherein the rubber having an unsaturated double bond is rubber vulcanizable with at least one vulcanizing agent selected from the group consisting of sulfur, sulfur donors and organic peroxides.

8. The conductive rubber composition according to claim 7, wherein the rubber having an unsaturated double bond is at least one rubber selected from the group consisting of acrylonitrile-butadiene rubber, acrylonitrile-isoprene rubber, acrylonitrile-butadiene-isoprene rubber, styrene-butadiene rubber, butadiene rubber, isoprene rubber, natural rubber, ethylene-propylene-diene rubber, butyl rubber and partially hydrogenated products thereof.

9. The conductive rubber composition according to claim 1, which comprises 20–80 wt. % of the rubber component (A) and 80–20 wt. % of the rubber component (B) as a rubber component.

10. The conductive rubber composition according to claim 1, which comprises the conductive particles in a proportion of 1–100 parts by weight per 100 parts by weight of the rubber component (B).

11. A process for producing a conductive rubber composition, which comprises the steps of kneading a rubber component (A), a rubber component (B) vulcanized by a mechanism different from that in the rubber component (A), conductive particles, and a vulcanizing agent for the rubber component (A), and vulcanizing only the rubber component (A).

12. A process for producing a conductive rubber composition, which comprises the steps of kneading a rubber component (A), a rubber component (B) vulcanized by a mechanism different from that in the rubber component (A), a vulcanizing agent for the rubber component (A), and a part of conductive particles to be incorporated, vulcanizing only the rubber component (A), and then adding a vulcanizing agent for the rubber component (B) and the remainder of the conductive particles to be incorporated.

13. A process for producing a conductive rubber composition, which comprises the steps of kneading a rubber component (A), a rubber component (B) vulcanized by a mechanism different from that in the rubber component (A), and a vulcanizing agent for the rubber component (A), vulcanizing only the rubber component (A), and then adding a vulcanizing agent for the rubber component (B) and conductive particles.

14. A conductive rubber member comprising a vulcanizate of a rubber component (A), a vulcanizate of a rubber component (B) vulcanized by a mechanism different from that in the rubber component (A), and conductive particles, wherein the vulcanizate of the rubber component (A) is vulcanized with a vulcanizing agent which can not vulcanize the rubber component (B) under the vulcanizing conditions of the rubber (A), and wherein the vulcanizate of the rubber component (A) is dispersed in the vulcanizate of the rubber component (B), and at least the vulcanizate of the rubber component (B) contains the conductive particles.

15. The conductive rubber member according to claim 14, wherein a microdomain structure composed of a vulcanizate phase of the rubber component (A) and a vulcanizate phase of the rubber component (B) is formed, and the concentration of the conductive particles in the vulcanizate phase of the rubber component (B) is higher than that in the vulcanizate phase of the rubber component (A).

16. The conductive rubber member according to claim 14, which has an electric resistance value ranging from $10^3$ to $10^{10}$ Ω (as measured at 23° C. and 50% RH) and a JIS-A hardness ranging from 20 to 60°.

17. The conductive rubber member according to claim 14, wherein the rubber component (A) is rubber vulcanizable with any other vulcanizing agent than vulcanizing agents selected from among sulfur, sulfur donors and organic peroxides.

18. The conductive rubber member according to claim 14, wherein the rubber component (A) is rubber having an epoxy group or a halogen atom in its molecular chain.

19. The conductive rubber member according to claim 14, wherein the rubber component (B) is rubber having an unsaturated double bond not corresponding to the rubber component (A).

20. The conductive rubber member according to claim 19, wherein the rubber having an unsaturated double bond is rubber vulcanizable with at least one vulcanizing agent selected from the group consisting of sulfur, sulfur donors and organic peroxides.

21. A process for producing a conductive rubber member, which comprises the steps of kneading a rubber component (A), a rubber component (B) vulcanized by a mechanism different from that in the rubber component (A), conductive particles, and a vulcanizing agent for the rubber component (A), vulcanizing only the rubber component (A), adding and kneading a vulcanizing agent for the rubber component (B), forming the resultant mixture into the desired shape, and then vulcanizing the rubber component (B).

22. A process for producing a conductive rubber member, which comprises the steps of kneading a rubber component (A), a rubber component (B) vulcanized by a mechanism different from that in the rubber component (A), a vulcanizing agent for the rubber component (A), and a part of conductive particles to be incorporated, vulcanizing only the rubber component (A), adding and kneading a vulcanizing agent for the rubber component (B), and the remainder of the conductive particles to be incorporated, forming the resultant mixture into the desired shape, and then vulcanizing the rubber component (B).

23. A process for producing a conductive rubber member, which comprises the steps of kneading a rubber component (A), a rubber component (B) vulcanized by a mechanism different from that in the rubber component (A), and a vulcanizing agent for the rubber component (A), vulcanizing only the rubber component (A), adding and kneading a vulcanizing agent for the rubber component (B), and conductive particles, forming the resultant mixture into the desired shape, and then vulcanizing the rubber component (B).

24. A conductive rubber-covered roll comprising a conductive mandrel, and a coating rubber layer containing conductive particles and formed on the peripheral surface of the mandrel, wherein the coating rubber layer comprises a vulcanizate of a rubber component (A), a vulcanizate of a rubber component (B) vulcanized by a mechanism different from that in the rubber component (A), and the conductive particles, and wherein the vulcanizate of the rubber component (A) is vulcanized with a vulcanizing agent which can not vulcanize the rubber component (B) under the vulcanizing conditions of the rubber (A), and further wherein the vulcanizate of the rubber component (A) is dispersed in the vulcanizate of the rubber component (B), and at least the vulcanizate of the rubber component (B) contains the conductive particles.

25. The conductive rubber-covered roll according to claim 24, wherein a microdomain structure composed of a vulcanizate phase of the rubber component (A) and a vulcanizate phase of the rubber component (B) is formed, and the concentration of the conductive particles in the vulcanizate phase of the rubber component (B) is higher than that in the vulcanizate phase of the rubber component (A).

26. The conductive rubber-covered roll according to claim 24, which has an electric resistance value ranging from $10^3$ to $10^{10}$ $\Omega$ (as measured at 23° C. and 50% RH) and a JIS-A hardness ranging from 20 to 60°.

27. The conductive rubber-covered roll according to claim 24, wherein the rubber component (A) is rubber vulcanizable with any other vulcanizing agent than vulcanizing agents selected from among sulfur, sulfur donors and organic peroxides.

28. The conductive rubber-covered roll according to claim 24, wherein the rubber component (A) is rubber having an epoxy group or a halogen atom in its molecular chain.

29. The conductive rubber-covered roll according to claim 24, wherein the rubber component (B) is rubber having an unsaturated double bond not corresponding to the rubber component (A).

30. The conductive rubber-covered roll according to claim 29, wherein the rubber having an unsaturated double bond is rubber vulcanizable with at least one vulcanizing agent selected from the group consisting of sulfur, sulfur donors and organic peroxides.

31. An image forming apparatus equipped with a conductive rubber-covered roll, wherein the conductive rubber-covered roll comprises a conductive mandrel, and a coating rubber layer formed on the peripheral surface of the mandrel and comprising a vulcanizate of a rubber component (A), a vulcanizate of a rubber component (B) vulcanized by a mechanism different from that in the rubber component (A), and conductive particles, and wherein the vulcanizate of the rubber component (A) is vulcanized with a vulcanizing agent which can not vulcanize the rubber component (B) under the vulcanizing conditions of the rubber (A), and further wherein the vulcanizate of the rubber component (A) is dispersed in the vulcanizate of the rubber component (B), and at least the vulcanizate of the rubber component (B) contains the conductive particles.

32. The image forming apparatus according to claim 31, wherein the conductive rubber-covered roll is at least one of a charging roll, a development roll and a transfer roll.

* * * * *